US008660202B2

(12) United States Patent
Jose et al.

(10) Patent No.: US 8,660,202 B2
(45) Date of Patent: Feb. 25, 2014

(54) ROBUST PRECODER AND RECEIVER FILTER DESIGN FOR GAUSSIAN INTERFERENCE CHANNEL

(75) Inventors: Jubin Jose, Bound Brook, NJ (US); Narayan Prasad, Wyncote, PA (US); Mohammad A. Khojastepour, Lawrenceville, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 245 days.

(21) Appl. No.: 13/234,945

(22) Filed: Sep. 16, 2011

(65) Prior Publication Data

US 2012/0069928 A1 Mar. 22, 2012

Related U.S. Application Data

(60) Provisional application No. 61/383,586, filed on Sep. 16, 2010.

(51) Int. Cl.
*H04L 1/02* (2006.01)
(52) U.S. Cl.
USPC .......................................................... 375/267
(58) Field of Classification Search
USPC .......................................................... 375/267
See application file for complete search history.

(56) References Cited

U.S. PATENT DOCUMENTS

| 8,451,951 B2 * | 5/2013 | Caire et al. | 375/340 |
| 2007/0280116 A1 * | 12/2007 | Wang et al. | 370/236 |
| 2008/0207238 A1 * | 8/2008 | Tosato | 455/507 |
| 2008/0268834 A1 * | 10/2008 | Foschini et al. | 455/426.1 |
| 2010/0081399 A1 * | 4/2010 | Zangi | 455/114.3 |

OTHER PUBLICATIONS

Gomadam, K., et al. "Approaching the Capacity of Wireless Networks Through Distributed Interference Alignment" IEEE Global Telecommunications Conference (GLOBECOM), Dec. 2008. pp. 1-10.
Khojastepour, M., et al. "Design of Multiuser Downlink Linear MIMO Precoding Systems With Quantized Feedback" IEEE Transactions on Vehicular Technology, vol. 58, No. 9. Nov. 2009. pp. 4828-4836.
Peters, S., et al. "Interference Alignment Via Alternating Minimization" Proceedings of the IEEE International Conference on Acoustics, Speech, and Signal Processing, ICASSP 2009. Apr. 2009. (5 pages).
Schmidt, D., et al. "Minimum Mean Squared Error Interference Alignment" Proc. of Asilomar Conference on Signals, Systems, and Computers. Nov. 2009. (5 pages).
Tajer, A., et al. "Robust Beamforming for Multi-Cell Downlink Transmission" Proc. IEEE International Symposium on Information Theory (ISIT 2010). Jun. 2010. pp. 2063-2067.
Vucic, N., et al. "Robust Transceiver Optimization in Downlink Multiuser MIMO Systems" IEEE Transactions on Signal Processing, vol. 57, No. 9. Sep. 2009. pp. 3576-3587.

* cited by examiner

*Primary Examiner* — Don N Vo
(74) *Attorney, Agent, or Firm* — Akitaka Kimura; Joseph Kolodka

(57) ABSTRACT

A system and method for providing at least one transmit precoder includes transforming at least one of a weighted sum-rate and max-min rate objective into two or more sub-problems by introducing at least one slack variable. The two or more sub-problems are iterated on a computer readable storage medium to provide at least one transmit precoder for each transmitter.

16 Claims, 5 Drawing Sheets

ROBUST PRECODER AND RECEIVER FILTER DESIGN FOR GAUSSIAN INTERFERENCE CHANNEL

RELATED APPLICATION INFORMATION

This application claims priority to provisional application Ser. No. 61/383,586 filed on Sep. 16, 2010, incorporated herein by reference.

BACKGROUND

1. Technical Field

The present invention relates to wireless communications, and in particular, to a precoder and receiver filter design for multiple-input and multiple-output interference networks.

2. Description of the Related Art

Linear transmit preceding and decoding schemes using linear receivers are degrees of freedom optimal. In precoder and receiver filter design, maximizing the weighted sum-rate and maximizing the minimum rate of the users are two important objectives. However, there are no directly solvable solutions to these two objectives. Moreover, in practice, although knowledge of the channel is not perfect, especially at the transmitter, work on multiple-input and multiple-output (MIMO) interference networks under channel uncertainty is limited. Thus, a need exists for a provably convergent, iterative solution for precoder design.

SUMMARY

A method for providing at least one transmit precoder includes transforming at least one of a weighted sum-rate and max-min rate objective into two or more sub-problems by introducing at least one slack variable. The two or more sub-problems are iterated on a computer readable storage medium to provide at least one transmit precoder for each transmitter.

A method for providing at least one transmit precoder includes transforming at least one of a weighted sum-rate and max-min rate objective into two or more sub-problems by introducing at least one slack variable, where the at least one objective has imperfect channel state information. The two or more sub-problems are formulated as at least one of a convex optimization problem and a problem explicitly solvable in closed form. The Schur complement is applied to convert infinitely many inequalities into a finite number of linear matrix inequalities. The two or more sub-problems are iterated on a computer readable storage medium to provide at least one transmit precoder for each transmitter.

A system for providing at least one transmit precoder includes a transformation module configured to transform at least one of a weighted sum-rate and a max-min rate objective into two or more sub-problems by introducing at least one slack variable. A solving module is configured to iterate the two or more sub-problems on a computer readable storage medium to provide at least one transmit precoder for each transmitter.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
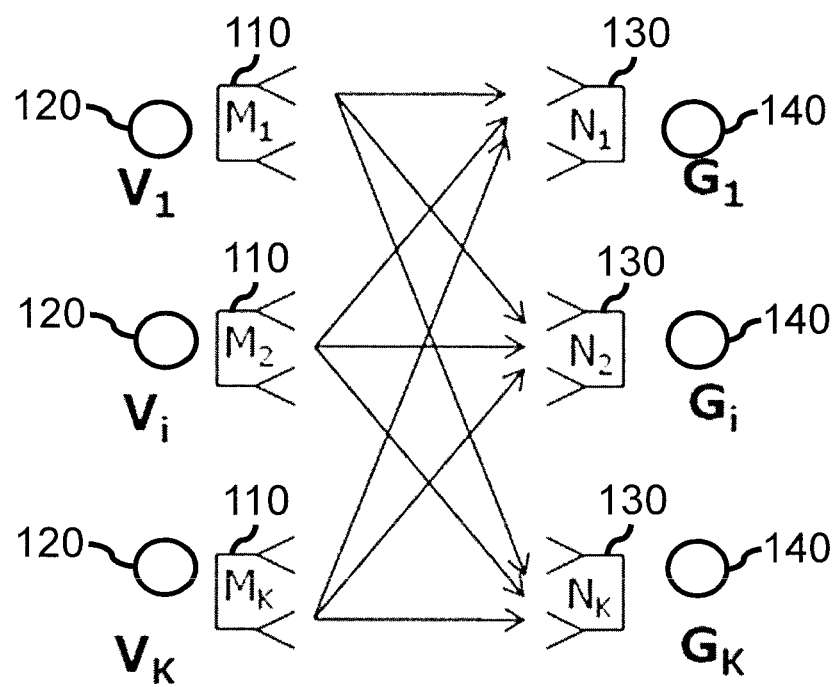
FIG. 1 is a block/flow diagram of an exemplary wireless network.

In accordance with the present principles, systems and methods are provided for a robust precoder and receiver filter design for K-user multiple-input and multiple-output (MIMO) Gaussian interference channels (GICs) consisting of K transmitter-receiver pairs. Two important objectives in system design are the weighted sum-rate and the max-min rate. The weighted sum-rate objective is particularly applicable when a higher-level scheduler ensures long-term fairness (or, in general, any utility maximization) by adapting the weights assigned to users with time. The max-min rate objective captures short-term fairness, which implies maximization of the minimum achievable rate in the system. However, these objectives do not have direct solutions.

The present principles provide a sub-optimal approach that is solvable by introducing a slack variable to create two or more sub-problems and iterating those sub-problems until convergence or the maximum number of iterations is reached. The present principles are applied to perfect channel state information (CSI) and imperfect CSI. Strategies for single-stream decoding and single-user decoding are contemplated.

Advantageously, the present principles significantly improve the performance of precoders over existing solutions by using multiple-stream transmission instead of single-stream beamforming. By breaking the precoder design procedure into convex optimization sub-problems or sub-problems explicitly solvable in closed form via the slack variable, the present principles guarantee convergence and provide a relatively fast way of computing the precoders. The present principles apply to general K-user MIMO interference channels with an arbitrary number of antennas at the transmitters and receivers. In addition to physical antennas, these antennas can model time-selectivity and frequency-selectivity present in wireless channels.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a block diagram of an exemplary wireless network 100 is illustratively depicted in accordance with one embodiment. Wireless network 100 includes K-user MIMO Gaussian interference channels consisting of transmitters 110 and receivers 130. Each transmitter 110 has a transmit precoder 120 and each receiver 130 has a receiver filter 140. There are K transmitter-receiver pairs. The $j^{th}$ transmitter 110 has $M_j$ antennas and the $i^{th}$ receiver 130 has $N_j$ antennas. The antennas can model time/frequency selective channels by appropriately choosing block-diagonal channel matrices. Each transmitter 110 has independent messages for the corresponding receiver 130.

Figure 2:
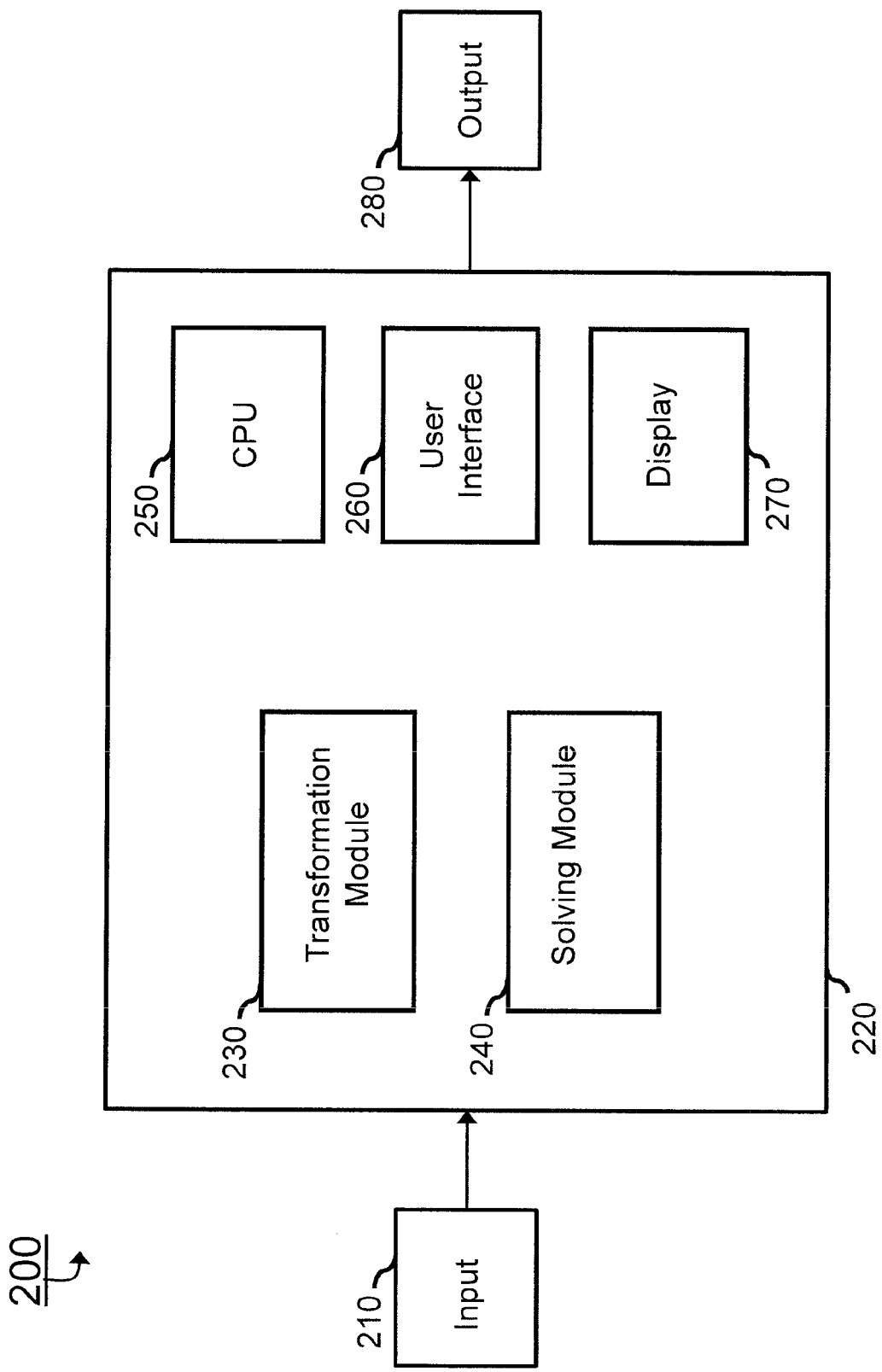
FIG. 2 is a block/flow diagram of the precoder and receiver filter design system/method, in accordance with one embodiment.

Referring now to FIG. 2, a block/flow diagram of a precoder and receiver filter design system 200 is illustratively depicted in accordance with one embodiment. Input 210 is inputted into precoder and receiver filter design system 220. Input 210 may include channel matrices $\hat{H}_{ij}$ for receivers $1 \leq i \leq K$ and transmitters $1 \leq j \leq K$ and number of streams for all transmitter-receiver pairs $d_i$, $1 \leq i \leq K$. In one embodiment, input 210 may also include error-in-norm corresponding to each channel estimate $\epsilon_{ij}$.

Transformation module 230 transforms an original problem into two or more sub-problems. The original problem may include the maximum weighted sum-rate objective and the max-min rate objective. The two or more sub-problems are convex and solvable. Transformation module 230 may introduce slack variables to transform input 210 into two or more sub-problems. In one embodiment, transformation module 230 applies convex optimization tools and/or obtains closed-form expressions. This may occur where there is perfect CSI. In another embodiment, transformation module 230 converts infinitely many inequalities into finitely many linear matrix inequalities (LMIs) and solves the LMIs using standard convex optimization tools. This may occur where there is imperfect CSI. Infinite inequalities may be converted into finite LMIs using the Schur complement together with Lemma 1, which are described later.

Solving module 240 solves the two or more sub-problems to produce output 280. Solving module 240 may apply iterative methods on the two or more sub-problems until convergence or the maximum number of iterations is reached. Output 280 includes transmit precoders $V_j$ for transmitters $1 \leq j \leq K$ and receiver filters $G_i$ for receivers $1 \leq i \leq K$. Precoder and receiver filter design system 220 may also include central processing unit (CPU) 250, user interface 260, and display 270.

Precoder and receiver filter design system 200 may be implemented in any wireless communication system, including cellular systems designed as per fourth generation cellular standards such as, e.g., Long Term Evolution—Advanced (LTE-A) with Coordinated Multi-Point Transmission/Reception (COMP) and the IEEE 802.16m. Furthermore, precoder and receiver filter design system 200 may be implemented as part of the transmit system, receiver system, and/or as a standalone unit.

The operation of the precoder and receiver filter design system 200 will now be described. The present principles will be discussed with respect to the maximum weighted sum-rate objective for single-stream decoding and single-user decoding with both perfect and imperfect CSI. Additionally, the present principles will be discussed with respect to the max-min rate objective with perfect and imperfect CSI.

Figure 3:
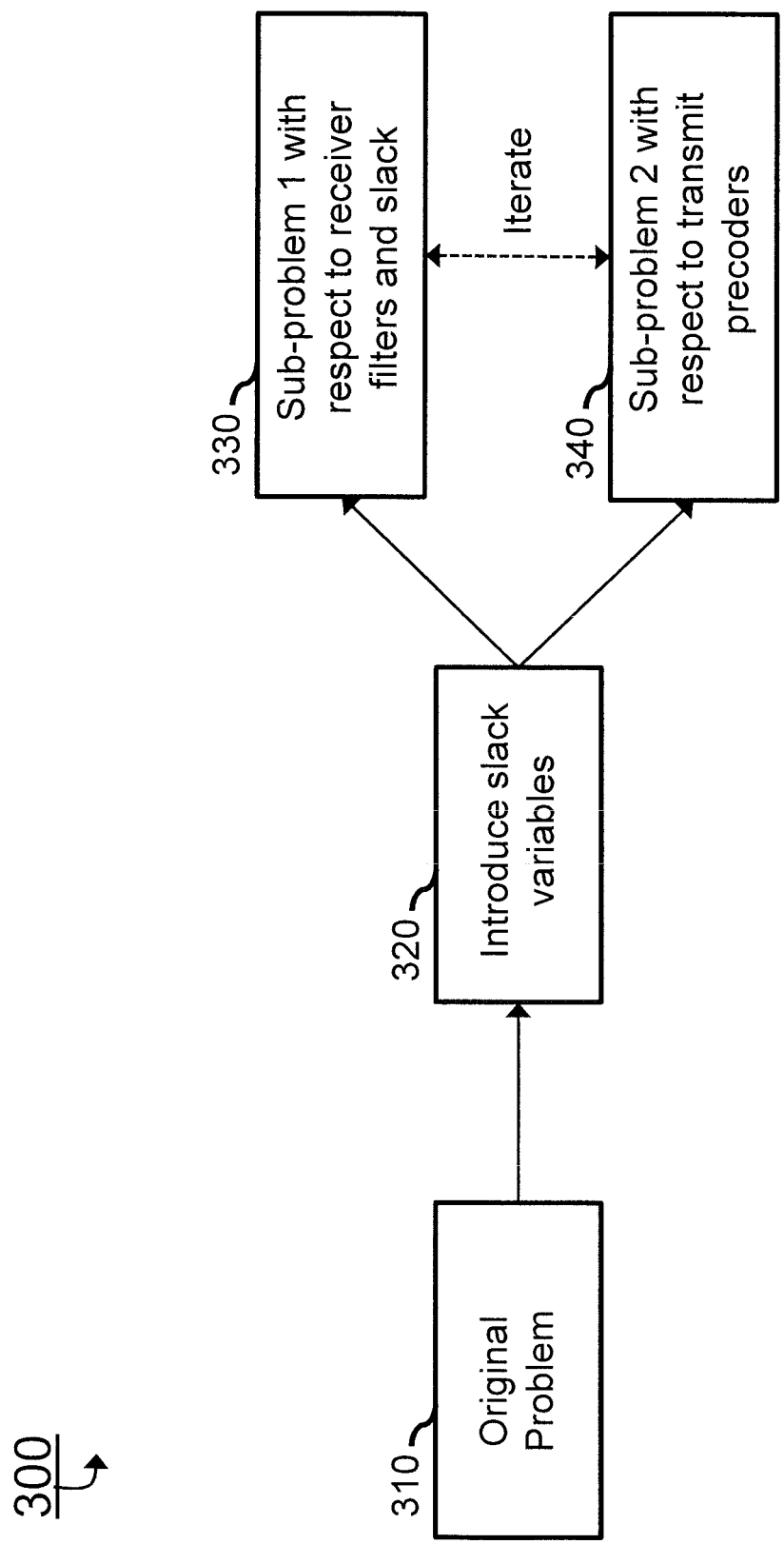
FIG. 3 is a block/flow diagram of the precoder and receiver filter design system/method for perfect channel state information, in accordance with one embodiment.

The precoder and receiver filter design will first be discussed with respect to single-stream decoding with perfect CSI for maximum weighted sum-rate. Referring now to FIG. 3, a block/flow diagram of the precoder and receiver filter design method for perfect channel state information 300 is illustratively depicted in accordance with one embodiment. FIG. 3 may be applicable for both the weighted sum-rate objective and max-min rate objective. In block 310, the original problem is first determined. In this embodiment, the original problem is the weighted-sum rate objective. A discrete-time channel model is assumed. At time $t, t \in Z_+$, the input-output relationship of the interference channel is shown in equation (1) as follows:

$$y_i[t] = \sum_{j=1}^{K} H_{i,j} x_j[t] + z_i[t] \qquad (1)$$

where $x_j[t] \in C^{M_j \times 1}$ is the signal transmitted by the $j^{th}$ transmitter, $H_{i,j} \in C^{N_j \times M_j}$ is the constant channel matrix from the $j^{th}$ transmitter to the $i^{th}$ receiver, $z_i[t] \in C^{N_j \times 1}$ is the additive complex Gaussian $CN(0, \sigma^2 I)$ noise at the $i^{th}$ receiver, and $y_i[t] \in C^{N_j \times 1}$ is the signal received at the $i^{th}$ receiver. For simplicity, the time index t is suppressed henceforth. The power constraint at every transmitter is $E[\|x_j\|^2] \leq P$, $\forall j$.

Preliminarily, the following lemmas will be used throughout this application.

Lemma 1 ("Schur Complement"): Let A, B and C be given matrices, and X be the symmetric matrix given by:

$$X = \begin{bmatrix} A & B \\ B^\dagger & C \end{bmatrix}.$$

If A is positive definite, then X is positive semi-definite if and only if $$C - B^\dagger A^{-1} B \geq 0.$$

Lemma 2: Let A, B and C be given matrices, with $A = A^\dagger$. Then the relation:

$$A \geq B^\dagger DC + C^\dagger D^{\dagger B}, \forall D : \|D\|_2 \leq \epsilon$$

is only valid, if and only if:

$$\exists \lambda \geq 0, \begin{bmatrix} A - \lambda C^\dagger C & -\epsilon B^\dagger \\ -\epsilon B & \lambda I \end{bmatrix} \geq 0.$$

Lemma 3: Consider the function $f(s) = -es + \log s + 1$ for any given $e > 0$.

Then, $$\max_{s \in \mathbb{R}_+} f(s) = \log\left(\frac{1}{e}\right),$$

with the optimum value $s^{opt} = 1/e$. Lemma 3 allows the introduction of auxiliary variables to obtain optimally solvable sub-problems. A matrix version of Lemma 3 is described as follows in Lemma 4.

Lemma 4: Let d be any integer and $E \in \mathbb{C}^{d \times d}$ be any matrix such that $E > 0$ and $|E| \leq 1$. Consider the function $f(S) = -\mathrm{Tr}(SE) + \log |S| + d$. Then, $$\max_{S \in \mathbb{C}^{d \times d}} f(S) = \log|E^{-1}|,$$

with the optimum value $S^{opt} = E^{-1}$.

The focus is on a communication scheme that uses linear transmit precoders and linear receive filters so that the $i^{th}$ transmitter-receiver pair can transmit and receive $d_i$ streams, which are encoded and decoded independently using point-to-point schemes. The independently encoded symbols at the $j^{th}$ transmitter is denoted by $\hat{x}_j \in \mathbb{C}^{j \times 1}$, the precoder at the $j^{th}$ transmitter is denoted by $V_j \in \mathbb{C}^{M_j \times d_j}$, and the filter at the $i^{th}$ receiver is denoted by $G_i \in \mathbb{C}^{N_i \times d_i}$. Using equation (1), the output of the $i^{th}$ receiver filter can be expressed as in equation (2).

$$\hat{y}_i = \sum_{j=1}^{K} G_i^\dagger H_{i,j} V_j \hat{x}_j + G_i^\dagger z_i \quad (2)$$

From equation (2), the received signal corresponding to the $l^{th}$ stream is given by equation (3).

$$\hat{y}_{i,l} = \sum_{j=1}^{K} \sum_{k=1}^{d_j} g_{i,l}^\dagger H_{i,j} v_{j,k} \hat{x}_{j,k} + g_{i,l}^\dagger z_i \quad (3)$$

The achievable rate corresponding to this stream can then be expressed as equation (4).

$$R_{i,l} = \max_{g_{i,l}} \log\left(1 + \frac{|g_{i,l}^\dagger H_{i,i} v_{i,l}|^2}{\sum_{(j,k) \neq (i,l)} |g_{i,l}^\dagger H_{i,j} v_{j,k}|^2 + \sigma^2 \|g_{i,l}\|^2}\right) \quad (4)$$

The design problem of obtaining the linear transmit precoders that maximize the weighted sum-rate is formulated in equation (5):

$$\max_{\{v_j\}} \sum_{i=1}^{K} \sum_{l=1}^{d_i} w_{i,l} R_{i,l} \quad (5)$$

$$\text{s.t.} \|V_j\|_F^2 \leq P, \forall j$$

where $w_{i,l} \in \mathbb{R}_+$ are given weights. It is noted that weights are often a function of the transmitter/receiver index and not the stream index. Therefore, to simplify an algorithm, the dependency on the stream index is removed.

In block 320, slack variables are introduced into the problem of equation (5). The mean-square-error (MSE) for the stream given in equation (3) is given by equation (6).

$$e_{i,l} = |g_{i,l}^\dagger H_{i,i} v_{i,l} - 1|^2 + \sum_{(j,k) \neq (i,l)} |g_{i,l}^\dagger H_{i,j} v_{j,k}|^2 + \sigma^2 \|g_{i,l}\|^2 \quad (6)$$

The MSE with the optimal receive filter is denoted by $\hat{e}_{i,l}$.

Lemma 5: The achievable rate $R_{i,l}$ in equation (4) and the MSE in equation (6) with optimal receive filter denoted by $\hat{e}_{i,l}$ have a one-to-one correspondence given by $$R_{i,l} = \log\left(\frac{1}{\hat{e}_{i,l}}\right), \forall i, l.$$

Using Lemma 5 and then applying Lemma 3 to introduce slack variables $s = \{s_{i,l}\}$, the optimization problem of equation (5) can be reformulated into the sub-problem in equation (7).

$$\max_{\{v_j : \|v_j\|^2 \leq P\}, s, \{G_i\}} \sum_{i=1}^{K} \sum_{l=1}^{d_i} w_{i,l}(-e_{i,l} s_{i,l} + \log s_{i,l} + 1) \quad (7)$$

Here, $e_{i,l}$ is the MSE given by equation (6). This formulation has a weighted MSE minimimization sub-problem that makes it more tractable.

In blocks 330 and 340 of FIG. 3, the optimization problem of equation (1) is transformed into two or more sub-problems. In block 330, the sub-problem with respect to receiver filters and slack variables is solved to update receiver filters $G_i$ for receivers $1 \leq i \leq K$ and slack variables s. The sub-problem in equation (7) with respect to receive filters and slack variables can be solved optimally in closed form using Lemma 6.

Lemma 6: Consider the sub-problem in equation (7) for any given $\{V_j\}, \forall j$. The optimal receive filters $G_i$ for receivers $1 \leq i \leq K$ can be obtained in closed form and are given by $$g_{i,l}^{opt} = \left(\sum_{j=1}^{K} H_{i,j} V_j V_j^\dagger H_{i,j}^\dagger + \sigma^2 I\right)^{-1} H_{i,i} v_{i,l}, \forall i, l \quad (8)$$

which can be readily expressed in matrix form as $$G_{i,l}^{opt} = \left(\sum_{j=1}^{K} H_{i,j}V_jV_j^\dagger H_{i,j}^\dagger + \sigma^2 I\right)^{-1} H_{i,i}V_{i,}, \forall i. \quad (9)$$

Furthermore, the optimal slack variables s is given by $$s_{i,l}^{opt} = \frac{1}{e_{i,l}}, \forall i, l \quad (10)$$

where $e_{i,l}$ is obtained by substituting equation (8) in equation (6).

In block 340, the sub-problem with respect to transmit precoders is solved to update transmit precoders $V_j$ for transmitters $1 \leq j \leq K$. For any given u and $\{G_i\}$, the sub-problem of interest to solve equation (7) is the following minimum weighted MSE problem:

$$\min_{\{V_j : \|V_j\|^2 \leq P\}} \sum_{i=1}^{K} \sum_{l=1}^{d_i} \alpha_{i,l} e_{i,l} \quad (11)$$

where $\alpha_{i,l} = w_{i,l} s_{i,l}$. Substituting equation (6) into equation (11), the optimization problem in equation (11) becomes:

$$\min_{\{V_j : \|V_j\|^2 \leq P\}} \sum_{i=1}^{K} \sum_{l=1}^{d_i} \alpha_{i,l} \left( |g_{i,l}^\dagger H_{i,i} v_{i,l} - 1|^2 + \sum_{(j,k) \neq (i,l)} |g_{i,l}^\dagger H_{i,j} v_{j,k}|^2 + \sigma^2 \|g_{i,l}\|^2 \right) \quad (12)$$

Let $A_i = \text{diag}\{\alpha_{i,l}, \ldots, \alpha_{i,di}\}$. Then, equation (12) can be expressed in matrix form as follows.

$$\min_{\{V_j : \|V_j\|^2 \leq P\}} \sum_{i=1}^{K} \left( \|A_i^{1/2} G_i^\dagger H_{i,i} V_i - A_i^{1/2}\|^2 + \sum_{j \neq i} \|A_i^{1/2} G_i^\dagger H_{i,j} V_j\|^2 + \sigma^2 \|A_i^{1/2} G_i^\dagger\|^2 \right) \quad (13)$$

Equation (13) can be solved optimally in closed-form except for a scalar variable using Lemma 7. This scalar variable can be obtained efficiently using a bisection search method.

Lemma 7: Consider the optimization problem in equation (13) for any given u and $\{G_i\}, \forall i$. Then, the optimal transmit precoders are given by $$V_j^{opt} = \left(\sum_{i=1}^{K} H_{i,j}^\dagger G_i A_i G_i^\dagger H_{i,j} + \lambda_j I\right)^{-1} H_{j,j}^\dagger G_j A_j \quad (14)$$

where each non-negative parameter $\lambda_j$ is such that the power constraint $\|V_j^{opt}\|^2 \leq P$ is satisfied. If $\lambda_j > 0$, then this inequality should be satisfied with an equality. Therefore, a unique $\lambda_j$ exists. The closed-form expression from equation (14) allows for using different weights per transmitter-receiver pair.

The results in Lemma 6 and Lemma 7 lead to a natural, iterative algorithm for single-stream decoding for weighted sum-rate maximization for perfect CSI. The sub-problems are iterated until convergence or the maximum number of iterations is reached. Advantageously, the introduction of the slack variables to produce sub-problems guarantees convergence. The algorithm for single-stream decoding for weighted sum-rate maximization for perfect CSI is summarized in the following steps:

1) Initialize the transmit precoders $\{V_j\}$ for transmitters $1 \leq j \leq K$ to a set of non-zero values satisfying the power constraints in equation (5);

2) Update receiver filters $\{G_i\}$ for receivers $1 \leq i \leq K$ using equation (9), and slack variables s using equation (10);

3) Update transmit precoders $\{V_j\}$ for transmitters $1 \leq j \leq K$ using equation (14); and 4) Iterate steps 2 and 3 until convergence or the maximum number of iterations is reached.

Figure 4:
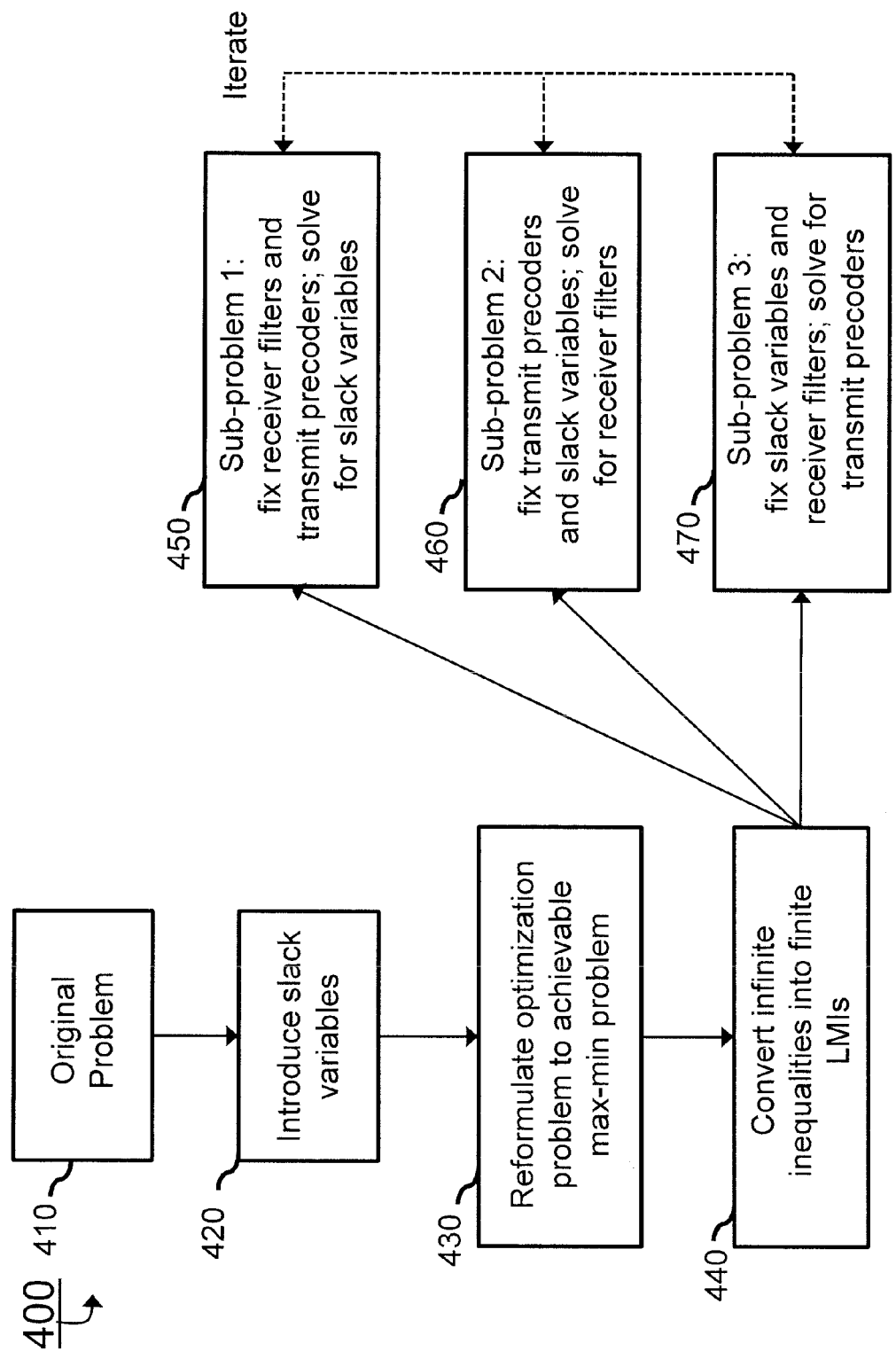
FIG. 4 is a block/flow diagram of the precoder and receiver filter design system/method for imperfect channel state information, in accordance with one embodiment.

In the case of single-stream decoding with imperfect CSI for maximum weighted sum-rate, the optimization problem of equation (5) is reformulated for a robust counterpart. Referring now to FIG. 4, a block/flow diagram of the precoder and receiver filter design for imperfect channel state information 400 is illustratively depicted in accordance with one embodiment. In block 410 of FIG. 4, the original problem is adjusted to account for channel uncertainty. In one embodiment, the original problem includes the maximum weighted sum-rate objective.

It is assumed that every channel matrix can be expressed as equation (15).

$$H_{i,j} = \hat{H}_{i,j} + \Delta_{i,j} \quad (15)$$

where $\hat{H}_{i,j}$ is the known channel estimate, and $\Delta_{i,j}$ is the unknown error with $\|\Delta_{i,j}\|_F \leq \in_{i,j}$ for some given $\in_{i,j} \geq 0$. A natural worst-case formulation of the optimization problem in equation (5) under channel uncertainty in equation (15) is formulated in equation (16).

$$\max_{\{V_j : \|V_j\|^2 \leq P\}} \min_{\{\Delta_{i,j} : \|\Delta_{i,j}\|_F \leq \in_{i,j}\}} \sum_{i=1}^{K} \sum_{l=1}^{d_i} \omega_{i,l} R_{i,l} \quad (16)$$

In block 420, slack variables are introduced. By introducing slack variables $s = \{s_{i,l}\}$, the optimization problem of equation (16) is reformulated to equation (17).

$$\max_{\{V_j : \|V_j\|^2 \leq P\}} \min_{\{\Delta_{i,j} : \|\Delta_{i,j}\|_F \leq \in_{i,j}\}} \max_{s, \{G_i\}} \sum_{i=1}^{K} \sum_{l=1}^{d_i} \omega_{i,l}(-e_{i,l} s_{i,l} + \log s_{i,l} + 1) \quad (17)$$

The steps used to arrive at equation (17) are the same as explained above for single-stream decoding with perfect CSI. However, this formulation does not directly lead to a useful algorithm. Therefore, the inner min-max problem in equation (17) is reformulated to a max-min version in block 430 of FIG. 4 as follows.

$$\max_{\{V_j: \|V_j\|^2 \le P\}} \min_{\{\Delta_{i,j}: \|\Delta_{i,j}\|_F \le \epsilon_{i,j}\}} \sum_{i=1}^{K} \sum_{l=1}^{d_i} \omega_{i,l}(-e_{i,l}s_{i,l} + \log s_{i,l} + 1) \quad (18)$$

$$s, \{G_i\}$$

Equation (18) provides an achievable weighted sum-rate. None of the optimization variables should depend on the perfect channel. It is noted that the weights corresponding to all streams of the same receiver are kept equal, but different weights across receivers are allowed.

In block 440, infinitely many inequalities are converted into finitely many LMIs. In one embodiment, the Schur complement together with Lemma 2 are used for this conversion. One important step is the derivation of an equivalent problem for the inner minimization in question (18), which is given in Lemma 9.

Lemma 9: The inner minimization in equation (18) is equivalent (in terms of objective) to the following $$\max_{\{\tau_{i,j}, \lambda_{i,j}\}} \sum_{j=1}^{K} \omega_i \left( -\sum_{j=1}^{K} \tau_{i,j} - \sigma^2 \|G_i B_i\|_F^2 + 2\log|B_i| + d_i \right)$$

$$\text{s.t.} \begin{bmatrix} \tau_{i,j} - \lambda_{i,j} & c_{i,j}^\dagger & 0 \\ c_{i,j} & I & -\epsilon_{i,j} c_{i,j} \\ 0 & -\epsilon_{i,j} C_{i,j}^\dagger & \lambda_{i,j} I \end{bmatrix} \ge 0, \forall i, j$$

$$\lambda_{i,j} \ge 0, \forall i, j.$$

The inner minimization in equation (18) can be expressed in matrix form:

$$\min_{\{\Delta_{i,j}: \|\Delta_{i,j}\|_F \le \epsilon_{i,j}\}} \sum_{i=1}^{K} \omega_i \left( -Tr(E_i B_i B_i^\dagger) + 2\log|B_i| + d_i \right).$$

Due to separation of variables, the focus can be on the following optimization problems.

For all i and j:

$$\min_{\Delta_{i,j}: \|\Delta_{i,j}\|_F \le \epsilon_{i,j}} -Tr(T_{i,j} B_i B_i^\dagger). \quad (19)$$

For each i and j, by introducing a slack variable $\tau_{i,j}$, the following problem is derived with the same optimal value as in equation (19).

$$\max_{\tau_{i,j}} -\tau_{i,j}$$

$$\text{s.t.} \quad \|B_i^\dagger (G_i^\dagger(\hat{H}_{i,j} + \Delta_{i,j}) V_j - \delta_{i,j} 1)\|_F^2 \le \tau_{i,j} \forall \{\Delta_{i,j}: \|\Delta_{i,j}\|_F \le \epsilon_{i,j}\} \quad (20)$$

The following notations will be used.

$$c_{i,j} = \text{vec}(B_i^\dagger(G_i^\dagger \hat{H}_{i,j} V_j - \delta_{i,j} I)),$$

$$C_{i,j} = V_j^T \otimes (B_i^\dagger G_i^\dagger),$$

$$d_{i,j} = \text{vec}(\Delta_{i,j})$$

Since $\text{vec}(ABC) = (C^T \otimes A)\text{vec}(B)$, equation (20) can be expressed as follows.

$$\|c_{i,j} + C_{i,j} d_{i,j}\|_2^2 \le \tau_{i,j}, \forall \{d_{i,j}: \|d_{i,j}\|_2 \le \epsilon_{i,j}\} \quad (21)$$

Applying the Schur Complement (Lemma 1), equation (21) is equivalent to $$\begin{bmatrix} T_{i,j} & c_{i,j}^\dagger \\ c_{i,j} & I \end{bmatrix} + \begin{bmatrix} 0 & d_{i,j}^\dagger C_{i,j}^\dagger \\ C_{i,j} d_{i,j} & 0 \end{bmatrix} \ge 0, \forall \{d_{i,j}: \|d_{i,j}\|_2 \le \epsilon_{i,j}\}. \quad (22)$$

Applying Lemma 2, equation (22) is equivalent to $$\exists \lambda_{i,j} \ge 0, \begin{bmatrix} T_{i,j} - \lambda_{i,j} & c_{i,j}^\dagger & 0 \\ c_{i,j} & I & -\epsilon_{i,j} C_{i,j} \\ 0 & -\epsilon_{i,j} C_{i,j}^\dagger & \lambda_{i,j} I \end{bmatrix} \ge 0. \quad (23)$$

In blocks 450, 460 and 470 of FIG. 4, the problem is transformed into two or more sub-problems. Each set of variables $\{B_i\}$, $\{G_i\}$ and $\{V_j\}$ can be solved optimally while the remaining two sets are fixed. From Lemma 9, the optimization problem in equation (18) can be expressed as $$\max_{\{V_j: \|V_j\|^2 \le P\}} \max_{\{\tau_{i,j}, \lambda_{i,j}\}} \sum_{i=1}^{K} \omega_i \left( -\sum_{j=1}^{K} \tau_{i,j} - \sigma^2 \|G_i B_i\|_F^2 + 2\log|B_i| + d_i \right) \quad (24)$$

$$\{B_i\}, \{G_i\}$$

$$\text{s.t.} \begin{bmatrix} T_{i,j} - \lambda_{i,j} & c_{i,j}^\dagger & 0 \\ c_{i,j} & I & -\epsilon_{i,j} C_{i,j} \\ 0 & -\epsilon_{i,j} C_{i,j}^\dagger & \lambda_{i,j} I \end{bmatrix} \ge 0, \forall i, j,$$

$$\lambda_{i,j} \ge 0, \forall i, j.$$

It is noted that the constraints in equation (24) are linear matrix inequalities in each set of variables while other two sets are fixed.

In block 450, matrix slack variables $S_i$ corresponding to receivers $1 \le i \le K$ are updated using the maximum determinants (MAX-DETs) resulting from equation (24) by fixing receiver filters G and transmit precoders V.

Lemma 10: consider the sub-problem in equation (24) for any given $\{V_j\}$ and $\{G_i\}$. Then the optimization for each i separates, and each $B_i$ can be solved by the resulting MAX-DET in equation (24) along with the constraint that B, is diagonal.

In block 460, receiver filters $G_i$ for receivers $1 \le i \le K$ are updated using the semi-definite programming (SDPs) resulting from equation (24) by fixing transmit precoders V and slack variables S. In block 470, transmit precoders $V_j$ for transmitters $1 \le j \le K$ are updated using the SDPs resulting from equation (24) by fixing slack variables S and receiver filters G.

Lemma 11: Consider the sub-problem in equation (24) for any given $\{V_j\}$ and $\{B_i\}$. Then the optimization for each i separates, and each G, can be solved efficiently by solving the resulting SDP in equation (24). Similarly, consider the sub-problem in equation (24) for any given $\{B_i\}$ and $\{V_i\}$. Then, the optimization for each j separates, and $V_j$ can be solved efficiently by solving the resulting SDP.

The results in Lemma 10 and Lemma 11 lead to a natural, iterative algorithm for single-stream decoding for weighted sum-rate maximization for imperfect CSI. The sub-problems are iterated until convergence or the maximum number of iterations is reached. Advantageously, the introduction of the slack variables to produce sub-problems guarantees convergence. The robustness of the algorithms can be tuned using the values of the error-in-norm $\epsilon_{ij}$. The algorithm for single-stream decoding for weighted sum-rate maximization for imperfect CSI is summarized in the following steps:

1) Initialize the transmit precoders $\{V_j\}$ for transmitters $1 \leq j \leq K$ to a set of non-zero values satisfying the power constraints in equation (16);
2) Update matrix slack variables $S_i$ corresponding to receivers $1 \leq i \leq K$ using the MAX-DETs resulting from equation (24);
3) Update receiver filters $\{G_i\}$ for receivers $1 \leq i \leq K$ using the SDPs resulting from equation (24);
4) Update transmit precoders $\{V_j\}$ for transmitters $1 \leq j \leq K$ using the SDPs resulting from equation (24); and
5) Iterate steps 2, 3 and 4 until convergence or the maximum number of iterations is reached.

The present principles may be extended to single-user decoding for maximum weighted sum-rate with both perfect and imperfect CSI. The single-user decoding procedure will closely follow the single-stream decoding procedure and is illustratively depicted in FIGS. 3 and 4 for perfect and imperfect CSI, respectively. With single-user decoding, the interference from other transmitters are treated as noise. The effective transmit symbols at the $j^{th}$ transmitter is denoted by $\hat{x}_j \in \mathbb{C}^{d_j \times 1}$ and the precoder at the $j^{th}$ transmitter is denoted by $\hat{V}_j \in \mathbb{C}^{M_j \times d_j}$. The received signal at the $i^{th}$ receiver is then given by equation (25).

$$y_i = \sum_{j=1}^{K} H_{i,j} V_j \hat{x}_j + z_i \tag{25}$$

Using single-user decoding, the rate achievable by the receiver is $$R_i = \log \left| I + V_i^\dagger H_{i,i}^\dagger \left( \sum_{j \neq i} H_{i,j} V_j V_j^\dagger H_{i,j}^\dagger + \sigma^2 I \right)^{-1} H_{i,i} V_i \right| \tag{26}$$

The problem of obtaining linear transmit precoders that maximize the weighted sum-rate is considered and formally stated in equation (27) as follows:

$$\max_{\{V_j\}} \sum_{i=1}^{K} \omega_i R_i \tag{27}$$
$$\text{s.t. } \|V_j\|_F^2 \leq P, \forall j,$$

where $w_i \in \mathbb{R}_+$ are given weights and $R_i$ in equation (27) is given by equation (26).

The robust counterpart of this problem is considered for bounded channel errors.

$$\max_{\{V_j : \|V_j\|^2 \leq P\}} \min_{\{\Delta_{i,j} : \|\Delta_{i,j}\|_F \leq \epsilon_{i,j}\}} \sum_{i=1}^{K} \omega_i R_i. \tag{28}$$

Recall that the MSE matrix of the received signal in equation (25) with the receiver filter $G_j \in \mathbb{C}^{N_i \times d_i}$ is defined as $$E_i = E[(G_i^\dagger y_i - \hat{x}_j)(G_i^\dagger y_i - \hat{x}_j)^\dagger]. \tag{29}$$

Let $\hat{G}_i$ denote the optimal receiver filter:

$$\hat{G}_i = \operatorname*{argmin}_{G_i} Tr(E_i), \tag{30}$$

and let $\hat{E}_i$ be the MSE matrix with the receive filter in equation (30) substituted in equation (29). For given transmit precoders, the optimal receive filters are the same as in the single-stream decoding scheme, which is given by equation (9). Note that the optimal filter does not change even if the objective is changed to $TR(SE_i)$ for any given $S > 0$.

Using Lemma 13, the determinant of the optimal MSE matrix is related to the achievable rate.

Lemma 13: The achievable rate $R_i$ in equation (26) and the MSE matrix with optimal receive filters $\hat{E}_i$ are related as follows $$R_i = \log|\hat{E}_i^{-1}|, \forall i.$$

Using Lemma 13 and applying Lemma 4 with matrix slack variables $S_i \forall \mathbb{C}^{d_i \times d_i}$, the optimization problem of equation (27) can be reformulated as $$\max_{\substack{\{V_j : \|V_j\|^2 \leq P\}, \\ \{G_i\}, \{S_i\}}} \sum_{i=1}^{K} \omega_i(-Tr(S_i E_i) + \log|S_i| + d_i) \tag{31}$$

Using equation (31), the results of the single-stream decoding scheme can be applied and the problem transformed into two or more sub-problems. For any given $\{V_j\}$, the optimal $\{G_i\}$ and $\{S_i\}$ are given by equation (9) and $S_i = E_i^{-1}$, respectively. For any given $\{G_i\}$ and $\{S_i\}$, optimal $V_j$ is given by equation (14) with $A_i$ replaced by $w_i S_i$. As in the single-stream decoding scenario, iterative algorithms can be derived for obtaining the transmit precoder for both perfect CSI and imperfect CSI. The main difference in the imperfect CSI scenario is the relaxation of a diagonal constraint corresponding to the slack variables. This appears in the update corresponding to the slack variables, and eventually affects all steps in the iteration.

The present principles can be further extended to the maximum-minimum-rate objective, which captures short-term fairness. This procedure closely follows the weighted sum-rate objective procedure and is illustratively depicted in FIGS. 3 and 4 for perfect CSI and imperfect CSI, respectively. Single-user decoding with imperfect CSI that leads to the set of achievable rates $\{R_i\}$ in equation (26) is considered. A natural robust precoder design problem in the presence of bounded errors is as follows.

$$\max_{\{V_j : \|V_j\|^2 \leq P\}} \min_{\{\Delta_{i,j} : \|\Delta_{i,j}\|_F \leq \epsilon_{i,j}\}} \min_i R_i$$

The optimal solution does not seem tractable (in the MIMO setting). Therefore, the present principles that are applied to the objective of weighted sum-rate are used to solve sub-problems optimally to obtain an iterative algorithm.

The same steps as in the weighted sum-rate objective are followed to arrive at the following optimization problem.

$$\max_{\{V_j:\|V_j\|^2\leq P\}} \min_{\{\Delta_{i,j}:\|\Delta_{i,j}\|_F\leq \epsilon_{i,j}\}} \min_i \max_{\{G_i\},\{S_i\}} (-Tr(S_iE_i) + \log|S_i| + d_i)$$

To keep the problem tractable, an achievable lower bound obtained by switching min-max to max-min is considered.

$$\max_{\{V_j:\|V_j\|^2\leq P\}} \min_{\{\Delta_{i,j}:\|\Delta_{i,j}\|_F\leq \epsilon_{i,j}\}} \min_i (-Tr(S_iE_i) + \log|S_i| + d_i). \quad (32)$$

$$\{G_i\}, \{S_i\}$$

By introducing slack variable $\beta$ and following the same procedure as in the weighted sum-rate objective, the optimization problem in equation (32) can be reformulated and transformed into two or more sub-problems.

$$\max_{\{V_j:\|V_j\|^2\leq P\},\{\tau_{i,j},\lambda_{i,j},\beta\}} \max \beta$$

$$\{G_i\}, \{S_i\}$$

$$\text{s.t.} -\sum_{j=1}^{K} \tau_{i,j} - \sigma^2\|G_iB_i\|_F^2 + 2\log|B_i| + d_i \geq \beta, \forall i,$$

$$\begin{bmatrix} T_{i,j}-\lambda_{i,j} & c_{i,j}^\dagger & 0 \\ c_{i,j} & I & -\epsilon_{i,j}C_{i,j} \\ 0 & -\epsilon_{i,j}C_{i,j}^\dagger & \lambda_{i,j}I \end{bmatrix} \geq 0, \forall i, j,$$

$$\lambda_{i,j} \geq 0, \forall ij.$$

For outer maximization in equation (32), individual maximizations in each set of variables can be solved optimally while the other two sets of variables are fixed. Particularly, for the individual maximization in $\{B_i\}$, the problems separate into K MAX-DETs, as in the weighted sum-rate problem. Note that variable $\beta$ does not have any explicit role as the problems separate. Similarly, the optimization in $\{G_i\}$ also separates into K SDPs, as in the weighted sum-rate problem. However, the difference is in the optimization of the precoder variables. For optimization in $\{V_j\}$, one joint SDP resulting from equation (32) needs to be solved while $\{B_i\}$ and $\{G_i\}$ are fixed. Thus, the above-mentioned three optimizations provide an iterative algorithm for a robust precoder design under max-min objective, which is guaranteed to converge.

The precoder design under the max-min rate objective with perfect CSI is achieved by setting the error-in-norm for every channel estimate $\epsilon_{ij}$ for receivers $1\leq i\leq K$ to zero in the imperfect CSI scenario.

Figure 5:
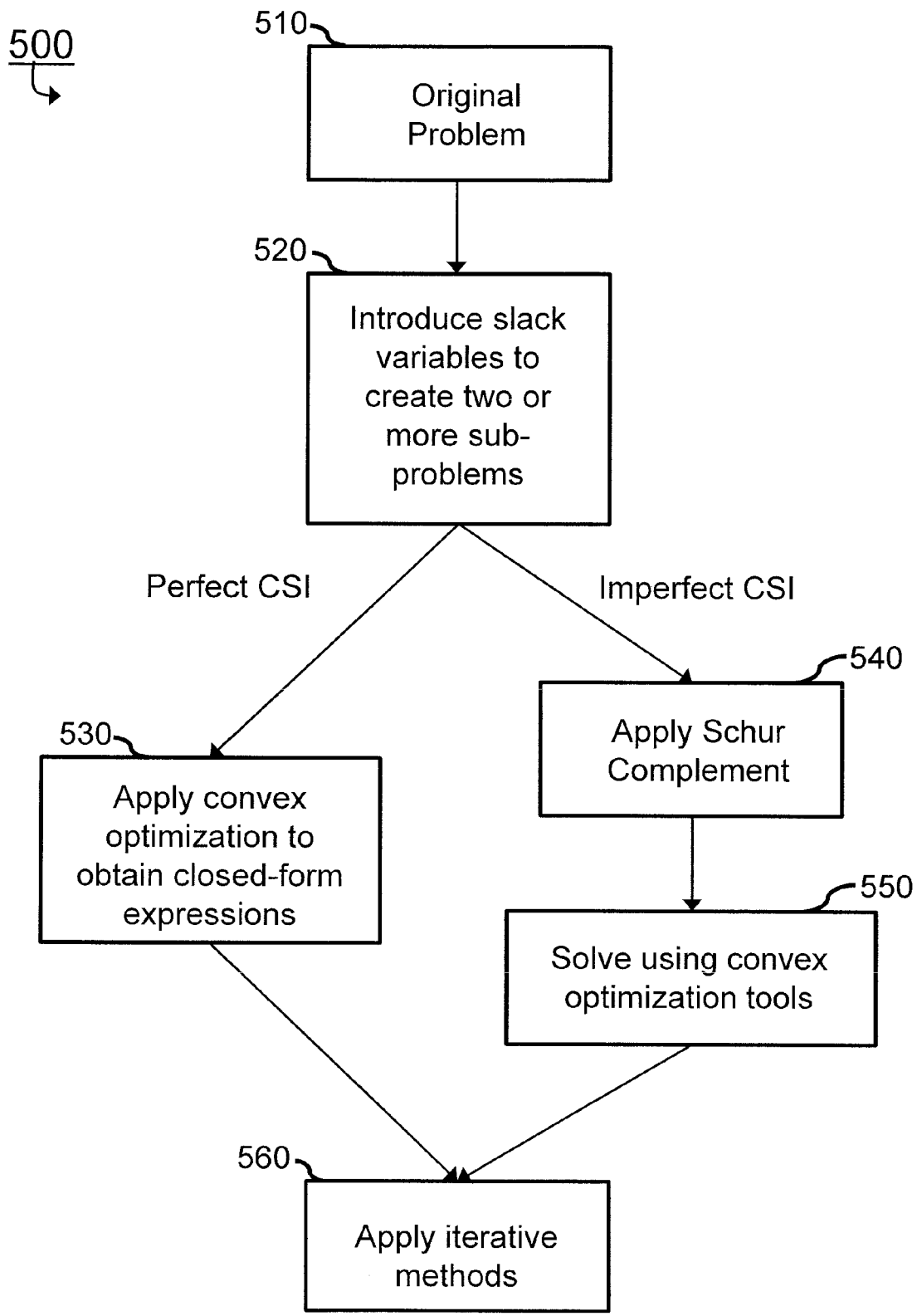
FIG. 5 is a block/flow diagram of the precoder and receiver filter design system/method, in accordance with one embodiment.

Referring now to FIG. 5, a block/flow diagram of the precoder and receiver filter design method 500 is illustratively depicted in accordance with one embodiment. In block 510, the original problem is provided. The original problem may include the weighted sum-rate objective and the max-min rate objective. The original problem may be adjusted for perfect and imperfect CSI and for single-stream and single-user decoding. In block 520, the original problem is split into two or more sub-problems by introducing slack variables.

In one embodiment, for perfect CSI, in block 530, convex optimization is applied to obtain closed-form expressions for each sub-problem. A bisection search method may also be applied to obtain a scalar variable. In another embodiment, for imperfect CSI, in block 540, the Schur complement (Lemma 1) is applied. The Schur complement together with Lemma-2 converts infinite inequalities into finite LMIs. Then, in block 550, for imperfect CSI, each sub-problem is solved using standard convex optimization tools. In block 560, for both perfect and imperfect CSI, the sub-problems are iteratively solved until convergence or until the maximum number of iterations is reached. For imperfect CSI, each set of variables $\{B_i\}$, $\{G_i\}$ and $\{V_j\}$ can be solved optimally by fixing the two other sets of variables.

Having described preferred embodiments of a robust precoder and receiver filter design for Gaussian interference channel (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for providing at least one transmit precoder, the method comprising:
   transforming at least one of a weighted sum-rate and max-min rate objective into two or more sub-problems by introducing at least one slack variable;
   iterating the two or more sub-problems on a computer readable storage medium to provide at least one transmit precoder for each transmitter; and
   applying the Schur complement to convert infinitely many inequalities into finitely many linear matrix inequalities,
   wherein the at least one objective includes imperfect channel state information.

2. The method as recited in claim 1, wherein the at least one objective includes perfect channel state information.

3. The method as recited in claim 2, further comprising formulating the two or more sub-problems as a convex optimization problem.

4. The method as recited in claim 1, wherein a robustness can be tuned using the values of an error-in-norm.

5. The method as recited in claim 1, wherein the two or more sub-problems are formulated as at least one of a convex optimization problem and a problem explicitly solvable in closed form.

6. The method as recited in claim 1, wherein transmit precoders allow for different weights per transmitter-receiver pair.

7. The method as recited in claim 1, wherein iterating further provides at least one receiver filter for each transmitter-receiver pair.

8. A non-transitory computer readable storage medium comprising a computer readable program, wherein the computer readable program when executed on a computer causes the computer to execute the method as recited in claim 1.

9. A method for providing at least one transmit precoder, the method comprising:
   transforming at least one of a weighted sum-rate and max-min rate objective into two or more sub-problems by introducing at least one slack variable, wherein the at least one objective has imperfect channel state information, and further wherein the two or more sub-problems are formulated as at least one of a convex optimization problem and a problem explicitly solvable in closed form;

applying the Schur complement to convert infinitely many inequalities into a finite number of linear matrix inequalities; and iterating the two or more sub-problems on a computer readable storage medium to provide at least one transmit precoder for each transmitter.

10. The method as recited in claim 9, wherein a robustness can be tuned using the values of an error-in-norm.

11. A system for providing at least one transmit precoder, the system comprising:
- a transformation module configured to transform at least one of a weighted sum-rate and a max-min rate objective into two or more sub-problems by introducing at least one slack variable;
- a solving module configured to iterate the two or more sub-problems on a computer readable storage medium to provide at least one transmit precoder for each transmitter; and
- an applying module configured to apply the Schur complement to convert infinitely many inequalities into finitely many linear matrix inequalities, wherein the at least one objective includes imperfect channel state information.

12. The system as recited in claim 11, wherein the at least one objective includes perfect channel state information and further comprising formulating the two or more sub-problems as a convex optimization problem.

13. The system as recited in claim 11, wherein a robustness can be tuned using the values of an error-in-norm.

14. The system as recited in claim 11, wherein the two or more sub-problems are formulated as at least one of a convex optimization problem and a problem explicitly solvable in closed form.

15. The system as recited in claim 11, wherein transmit precoders allow for different weights per transmitter-receiver pair.

16. The system as recited in claim 11, wherein the solving module further provides at least one receiver filter for each transmitter-receiver pair.

* * * * *